April 22, 1969  K. ZWICK  3,439,457
TOOL GRINDER WITH INSPECTION ATTACHMENT
Filed Oct. 30, 1967
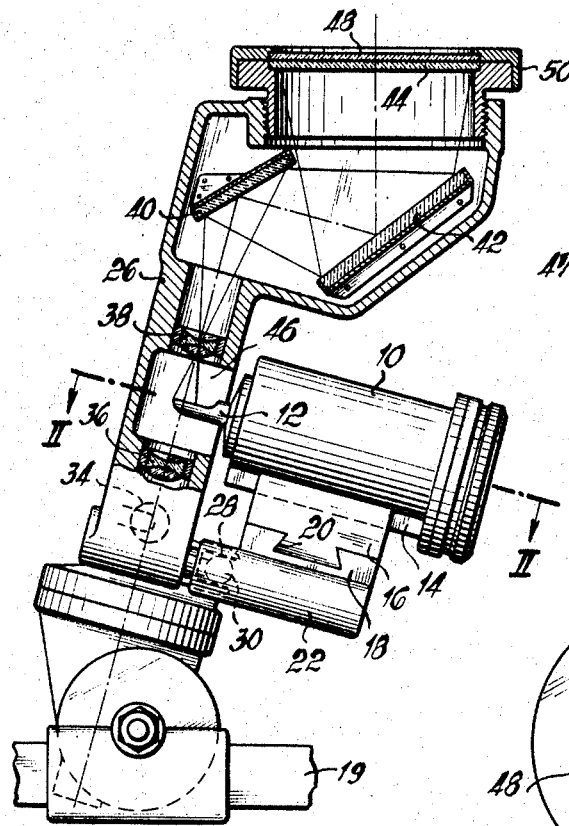
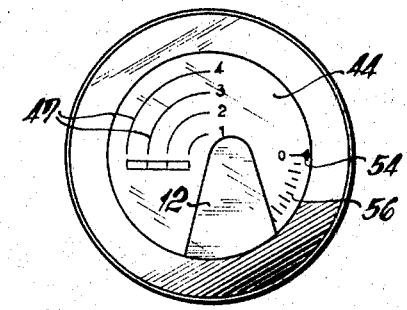
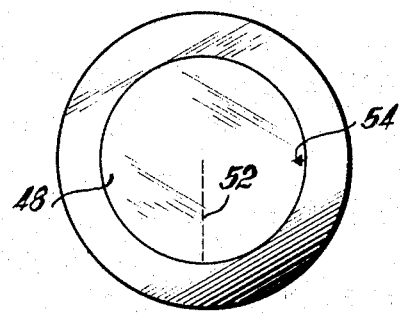
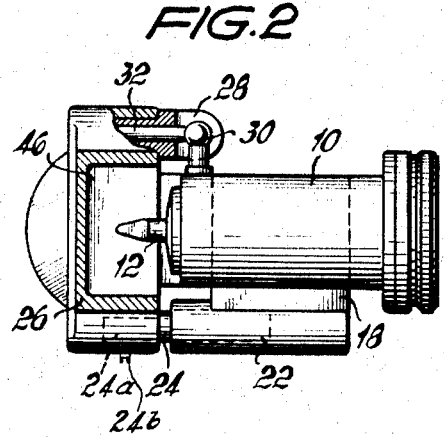
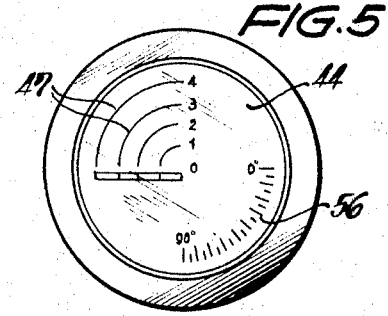
INVENTOR
Kurt Zwick
By Richard Low
Ag't

United States Patent Office 3,439,457
Patented Apr. 22, 1969

3,439,457
TOOL GRINDER WITH INSPECTION ATTACHMENT
Kurt Zwick, deceased, late of Munich, Germany by Margaretha Zwick, heiress, Munich, Germany, assignor to Feinmechanik Weilheim G.m.b.H., Weilheim, Germany
Continuation-in-part of application Ser. No. 313,823, Oct. 4, 1963. This application Oct. 30, 1967, Ser. No. 683,079
Claims priority, application Germany, Oct. 5, 1962, F 37,978
Int. Cl. B24b 49/12
U.S. Cl. 51—165                      7 Claims

ABSTRACT OF THE DISCLOSURE

A grinder for cutting tools whose tool holder is mounted on the grinder frame by a swivel also carrying a releasably mounted projector. The tool holder is movable on the swivel in a plane perpendicular to the optical axis of the projector so that angles and radii of the tool can be accurately measured in its projected image when the tool holder is swung away from the grinding wheel on the swivel, and the projector is installed.

Cross-reference to related application

This application is a continuation-in-part of the co-pending application Ser. No. 313,823, filed on Oct. 4, 1963.

Background of the invention

This invention relates to tool grinding machinery, and particularly to a tool grinder provided with an optical inspection attachment for monitoring the progress of the grinding operation.

When the cutting portion of a tool bit is to be ground to precisely defined angles and radii on a simple wheel under manual guidance, the progress of the grinding operation must be monitored carefully. While some indication of the ground shape may be obtained by inspecting the tool bit through a magnifying glass, more elaborate optical devices are needed for precision work.

Optical comparators are conventionally employed for projecting an enlarged shadow of the cutting tool on a screen, and precise measurements of the tool are readily taken from the projected image if the plane of the image maintains a known angular relationship to the tool. Inspection of a tool on conventional comparators requires the tool to be removed from the tool holder for inspection, and it must be returned to the tool holder of the grinder after inspection, a relatively difficult and time consuming operation if highest standards of precision are to be maintained.

It is relatively simple to install optical inspection devices on a machine in which the position of a workpiece is either fixed, or in which the workpiece is fastened in a holder which permits movement in a single plane only. In manually operated tool grinders, the tool holder proper is mounted on a swivel arm which permits angular movement of the tool holder and cannot readily be fixed in a reproducible position. An optical device permitting precise measurements of angles and radii to be taken on a tool while the tool is being held in a tool holder of such a grinding machine has not been available heretofore, and it is the primary object of the invention to provide a tool grinder with a removable, optical inspection attachment for precise measurement of angles and radii of a ground tool without removal of the tool from the grinder.

Summary of the invention

The supporting frame or casing of the grinder of this invention carries a rotatably mounted grinding wheel and its drive, as is conventional. A carrier arm pivotally mounted on the supporting structure of the grinder is provided with guides which secure a tool holder to the arm. The tool holder is equipped to hold a tool which has an axis and an axially terminal cutting portion in a fixed position of that axis relative to the tool holder. The aforementioned guides permit movement of the tool with the tool holder relative to the carrier arm only in a plane which is substantially parallel to the tool axis and fixed relative to the carrier.

An optical inspection device which permits inspection of the cutting portion of the tool is releasably mounted on the carrier arm in a position in which a portion of its optical axis intersects the plane of movement of the inspected tool at a fixed angle so that the mounted inspection device also moves pivotally relative to the grinding wheel with the carrier arm, but its optical axis cannot shift angularly relative to the axis of the inspected tool. A precisely determined spatial relationship of the tool and of the inspection device can therefore be established by merely moving the tool in the aforementioned plane, without removing the tool from the grinder. The precise alignment of the tool axis with the optical axis of the inspection device is easily determined by the latter.

Other features, additional objects, and many of the attendant advantages of this invention will readily become apparent from the following detailed description of a preferred embodiment when considered in connection with the attached drawing.

Brief description of the drawing

In the drawing:
FIG. 1 shows a portion of a grinder including a releasably mounted optical comparator in side elevation, and partly in section;
FIG. 2 shows the apparatus of FIG. 1 in section on the line II—II;
FIG. 3 is a plan view of the apparatus of FIG. 1;
FIG. 4 illustrates an element of the optical system of the comparator of FIG. 1 in a view corresponding to that of FIG. 3;
FIG. 5 shows another element of the optical system in a view analogous to that of FIG. 4.

Description of the preferred embodiment

Figure 6:
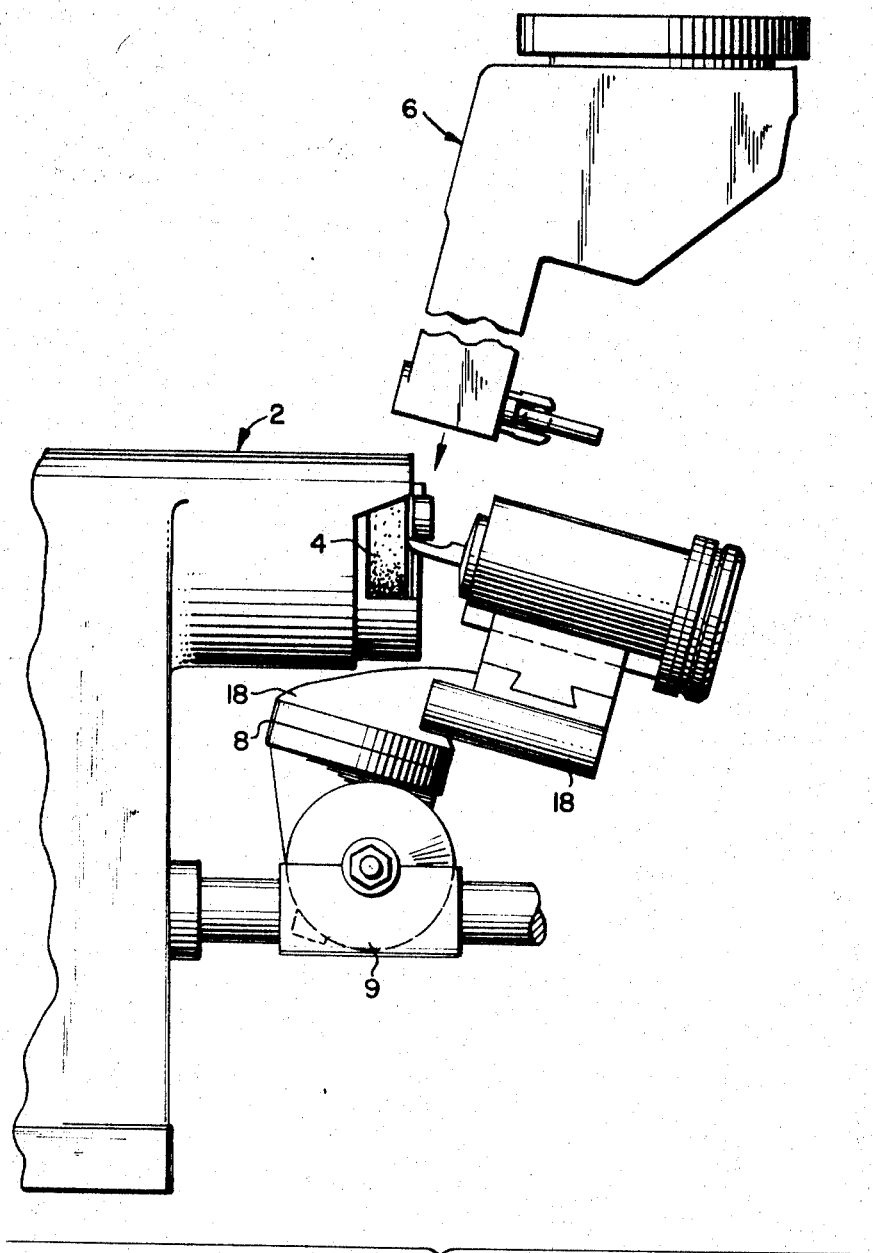
FIG. 6 shows a greater portion of the grinder and the detached comparator in side elevation.

Referring now to the drawing in detail, and initially to FIG. 6, there is seen the casing 2 of a tool grinder. The casing partly envelops a grinding wheel 4 which is mounted on the output shaft of an electric motor obscured by the casing 2 in the view of FIG. 6. The tool holder head 10 of the grinder is mounted on a cylindrical bar 19 of the grinder frame by means of a carrier arm 18, which is connected by a swivel joint 8 to a clamp 9 adjustably attached to the supporting frame structure. The carrier arm 18 not only carries the tool holder head 10, but also can carry an optical comparator 6, as is better seen in FIGS. 1 and 2, which shows the comparator attached to the more conventional elements of the grinder.

A cutter bit 12 is shown in FIGS. 1 and 2 to be held in the tool holder head 10 by means of a conventional chucking arrangement, not illustrated in detail. The tool holder head 10 is mounted on a feed slide 14 for movement in the direction of the cutter bit axis on a carriage 16. The latter is secured on the carrier arm 18 by a dovetail tenon on the carriage which engages a conforming groove 20 of the carrier arm 18 to permit movement of the carriage at right angles to the axis of the bit 12 and to the direction of feeding movement of the slide 14.

The arm 18 permits the tool holder head 10 to be pivoted toward and away from the grinding wheel 4 while the wheel rotates for shaping the axially terminal cutting portion of the bit 12 when the comparator 6 is removed. The feed screws and similar devices which move the tool holder head 10 on the slide 14, move the slide on the carrier arm 18, and secure the slide and head in the adjusted positions have not been illustrated since they may be entirely conventional. The slide 14 and the associated guiding parts of the tool holder head 10 and of the arm 18 limit movement of the chucked bit 12 to a plane which is fixed relative to the carrier arm 18, and pivots with the carrier arm.

A guide sleeve 22 parallel to the bit axis is fixedly fastened to the arm 18. A cylindrical portion 24 of a pin is movably received in the sleeve 22. The pin has another cylindrical portion 24a whose axis is parallel to, but offset from the axis of the pin portion 24. The pin portion 24a is mounted on the base portion of a housing 26 whose head portion accommodates most of the optical comparator system of the apparatus of the invention. The pin portion 24a is rotatable in a conforming recess of the housing 26, and is equipped with a set screw 24b for fastening it to the housing in an adjusted position.

Rotation of the housing 26 guided by the pin 24 and the coaxial sleeve 22 is limited by an abutment mechanism which includes a forked member 28 fastened on the housing 26. In the illustrated operative position of the apparatus, the forked end of the member 28 engages a spherical abutment 30 fixedly fastened on the arm 18 and horizontally projecting therefrom. Engagement of the forked member 28 with the abutment 30 fixes the angular position with respect to the common axis of the sleeve 22 and the pin 24, and with respect to the axis of the bit 12. The unitary end portion of the member 28 is tubular and receives a pin 32 which is longitudinally movable in the member 28, and equipped with a nonillustrated set screw for fastening it in a desired position. The pin 32 normally abuts against the spherical member 30, and thereby precisely determines the perpendicular position of the optical axis with respect to the axis of the bit 12.

The head portion of the housing 26 supports and partly encloses the elements of the optical system which cooperates with an electrical bulb 34 and a condenser lens 36 and mainly consists of an objective lens 38, a pair of deviating first surface mirrors 40, 42, and a ground glass viewing screen 44. A laterally open, but otherwise closed chamber 46 in the middle portion of the housing 26 permits the tool bit 12 to be inserted in a position of alignment with the optical axis of the objective lens 38 which coincides with the pivot axis of the swivel 8. When the bulb 34 is energized, and enlarged shadow of the bit 12 is cast on the ground glass screen 44. A circular glass disc 48 is set in an externally knurled ring 50. The ring is rotatably mounted on the housing 26 in such a manner that the disc 48 is directly superimposed on the ground glass screen 44.

When viewed in the direction of their common optical axis in the operation of the apparatus, the screen 44 and disc 48 appear as shown in FIG 3, and the images of indicia on the screen and the disc are superimposed on an image of the cutter bit 12. Numbered arcuate lines 47 are etched into the ground glass screen 44 and define concentric circles about the optical axis. The ground glass screen, which is shown separately in FIG. 5 further carries an etched peripheral scale scale 56 calibrated in degrees of arc about the optical axis from 0 to 90°. The zero point of the scale is optically aligned wtih a plane passing through the axis of the optical system and parallel with the axis of the bit 12.

The disc 48 which is mounted for rotation about the axis of the optical system is shown separately in FIG. 4. It is provided with an engraved radial reference line 52 and an index mark 54 angularly offset 90° from the reference line 52.

When the rounded tip of a cutter bit is concentrically aligned with the lines 47 by movement of the slide 14 relative to the carriage 16, and movement of the latter relative to the arm 18, the radius of curvature of the tip may be determined or estimated in an obvious manner. As is seen in FIG 3, the apparatus also permits the angle between a cutting edge of the bit 12 and the bit axis to be measured precisely.

The housing 26 is detachable from the grinding apparatus by sliding movement in the direction of the axes of the sleeve 22 and the pin 32. The comparator 6 is attached to the grinding apparatus by engaging the pin 24 with the sleeve 22, and by engaging the forked member 28 with the spherical abutment 30. Attaching the optical system to the arm 18 automatically sets the optical axis of the system in a plane parallel to the bit axis at right angles to the latter, and passing through the fixed zero mark on the scale 54. The tool holder head 10 is moved in a plane in two directions to each other until the cutting edge to be inspected passes through the optical axis of the system as viewed on the screen 44. The ring 50 is rotated until the line 52 is in alignment with the image of the cutting edge of the bit 12 on the screen 44. When alignment is reached, the line 52 becomes practically invisible, as shown in FIG 3. The index mark 54 then indicates the angle between the cutting edge and the bit axis on the scale 56.

It is most advantageous to arrange the fixed scale 56 in such a manner that its zero mark define a plane passing through the axis of the optical system and parallel with the bit axis, but the angular relationship of the mark 54 and the reference line 52 may be varied at will to make it consistent with the chosen angular relationship between the scale 54 and the axis of the cutter bit 12, as viewed on the screen 44. It is important that the optical system be fixed in an operative position on the machine frame 19 in which the optical axis of the system can intersect the cutter bit axis at right angles in the chamber 46.

It is preferred to use an optical system including a screen on which an image of the cutter bit is projected, as is conventional in comparators, but an ocular lens for directly viewing the cutter bit may be substituted for the screen in a known manner without departing from the spirit of the invention. The specific arrangement of an index mark, scale, and reference line on the screen 44 and the disc 48 may further be modified by interchanging their positions on the screen and disc in an obvious manner.

Other modification and variations of the present invention are possible in the light of the above teachings. Is is therefore to be understood that within the scope of the appended claims, the invention may be practiced otherwise than as specifically described.

What is claimed is:

1. In a tool grinding apparatus, in combination:
    (a) a normally stationary support;
    (b) a grinding wheel rotatably mounted on said support;
    (c) a carrier pivotally mounted on said support;
    (d) tool holder means for holding a tool having an axis and an axially terminal cutting portion in a fixed position of said axis relative to said tool holder means;
    (e) fastening means securing said tool holder means to said carrier for movement relative thereto,
        (1) said fastening means including guide means for limiting movement of said tool with said tool holder to a single plane substantially parallel to said axis and fixed relative to said carrier,
        (2) said cutting portion moving toward and away from said grinding wheel when said carrier pivots on said support and when a tool held by said tool holder means moves in said plane;

(f) optical inspection means for inspecting said cutting portion, said inspecting means having an optical axis; and (g) mounting means for releasably mounting said inspection means on said carrier in a fixed position in which said optical axis intersects said plane at a fixed angle proximate the terminal cutting portion of the tool, whereby the mounted inspection means moves relative to said wheel with said carrier.

2. In an apparatus as set forth in claim 1, said optical axis being perpendicular to said plane.

3. In an apparatus as set forth in claim 2, said inspection means including a light source for illuminating said cutting portion, screen means, and lens means for projecting an image of said cutting portion on said screen means.

4. In an apparatus as set forth in claim 3, said inspection means including a housing having a base portion, a head portion, and a portion intermediate said base and head portions and defining a chamber open in the direction of the axis of said tool in the mounted condition of said inspection means and substantially closed in all other directions, said mounting means securing said base portion to said carrier, said head portion accommodating said screen means, and the optical axis of said inspecting means passing through said chamber for intersection with the axis of said tool.

5. In an apparatus as set forth in claim 5, said screen means including two members rotatable relative to each other about a portion of said optical axis and index means on said members of the screen means for indicating the relative angular positions of said members, the index means on one of said members being alignable with the projected image of said cutting portion by movement of said tool in said plane.

6. In an apparatus as set forth in claim 3, said screen means including index means defining a plurality of concentric circular arcs in a plane perpendicular to the portion of said optical axis intersecting said screen means.

7. In an apparatus as set forth in claim 1, swivel means interposed between said support and said carrier mounting said carrier on said support for pivoting movement about said optical axis.

References Cited

UNITED STATES PATENTS

| | | |
|---|---|---|
| 1,907,469 | 5/1933 | Thomson. |
| 2,025,215 | 12/1935 | Munn. |
| 2,144,095 | 1/1939 | Zwick _____ 51—124 |
| 2,225,489 | 12/1940 | Tessky. |
| 2,234,539 | 3/1941 | Cooke. |
| 2,326,319 | 8/1943 | Bailey. |
| 2,485,355 | 10/1949 | Brennan _____ 51—165.40 X |
| 2,794,362 | 6/1957 | Yale. |

JEWELL H. PEDERSEN, *Primary Examiner.*

A. A. KASHINSKI, *Assistant Examiner.*

U.S. Cl. X.R.

356—39